(12) United States Patent
Reiter

(10) Patent No.: US 6,178,411 B1
(45) Date of Patent: *Jan. 23, 2001

(54) INTERACTIVE PROCESS FOR APPLYING OR PRINTING INFORMATION ON LETTERS OR PARCELS

(76) Inventor: Joshua J. Reiter, 500 W. University Pkwy., #12-T, Baltimore, MD (US) 21210

( * ) Notice: Under 35 U.S.C. 154(b), the term of this patent shall be extended for 0 days.

This patent is subject to a terminal disclaimer.

(21) Appl. No.: 09/113,200

(22) Filed: Jul. 10, 1998

Related U.S. Application Data

(63) Continuation-in-part of application No. 08/863,631, filed on May 27, 1997, now Pat. No. 5,819,241.
(60) Provisional application No. 60/018,468, filed on May 28, 1996.

(51) Int. Cl.[7] .................................................. G07B 17/00
(52) U.S. Cl. ........................................... 705/408; 705/410
(58) Field of Search ................................... 705/401, 408, 705/410

(56) References Cited

U.S. PATENT DOCUMENTS

| | | | |
|---|---|---|---|
| 3,791,293 | * 2/1974 | Rastorguyeff et al. | 101/234 |
| 4,149,711 | 4/1979 | Jackson | 270/57 |
| 4,752,675 | * 6/1988 | Zetmeir | 235/375 |
| 4,800,504 | 1/1989 | Durst, Jr. et al. | 235/375 X |
| 4,831,554 | * 5/1989 | Storace et al. | 705/403 |
| 4,868,757 | 9/1989 | Gil | 364/464.02 |
| 5,039,075 | 8/1991 | Mayer | 270/1.1 |
| 5,143,362 | 9/1992 | Doane et al. | 270/1.1 |
| 5,186,443 | 2/1993 | Manley et al. | 270/1.1 |
| 5,216,620 | 6/1993 | Sansone | 364/478 |
| 5,313,404 | 5/1994 | Wu | 364/466 X |
| 5,446,919 | * 8/1995 | Wilkins | 455/6.5 |
| 5,471,925 | * 12/1995 | Heinrich et al. | 101/91 |
| 5,490,077 | * 2/1996 | Freytag | 705/405 |
| 5,519,624 | 5/1996 | Hidding | 235/375 X |
| 5,602,743 | * 2/1997 | Freytag | 705/408 |
| 5,819,241 | * 10/1998 | Reiter | 705/408 |

FOREIGN PATENT DOCUMENTS 4-258056 * 9/1992 (JP) .

OTHER PUBLICATIONS

PR newswire: "Computer–Based Inserting System for Banks Launched by Pitney Bowes"; Mar. 20, 1987.*

Ezop: "Database Marketing Research"; Marketing Reasearch: A Magazine of Management & Applications; Fall 1994: v6 n4 pp. 34–41.*

* cited by examiner

Primary Examiner—Edward R. Cosimano
(74) Attorney, Agent, or Firm—Griffin & Szipl, P.C.

(57) ABSTRACT

A computer system for providing commercial advertisements, messages, coupons, or other types of information on letters, parcels, and other written communications to a receiver of the letter, parcel, or other written communications includes a processor coupled to the letter or parcel delivery network. The processor is configured to print or apply messages on letters or packages and to gather statistics regarding actions performed by the receivers of the communications; the processor is further configured to process the statistics to generate user data and to provide commercial advertisements to the receivers of letters and packages based on user data. The system also includes a processor coupled to the delivery network, and is configured to send advertisements to an apparatus to print or apply them on appropriate, targeted letters or packages during any of the phases of letter or parcel delivery, and to gather statistics regarding actions performed by the user. The processor will be configured to process statistics and to generate user data. The processor will further be configured to provide commercial advertisements to the user based on user data. The system is also used to calculate postage and apply postage indications to the letters or parcels.

35 Claims, 7 Drawing Sheets

INTERACTIVE PROCESS FOR APPLYING OR PRINTING INFORMATION ON LETTERS OR PARCELS

This is a continuation-in-part application of U.S. patent application, Ser. No. 08/863,631, which was filed on May 27, 1997, and which issued as U.S. Pat. No. 5,819,241 on Oct. 6, 1998, and which, in turn, is a continuation-in-part of Provisional Patent Application No. 60/018,468, filed May 28, 1996 and now abandoned. The complete disclosure of each of these applications are incorporated herein by reference.

FIELD OF THE INVENTION

The present invention relates to an interactive process for handling mail, specifically for applying or printing information on letters and parcels. More particularly, the invention relates to an interactive process in which a database of demographic and other relevant information is used to selectively apply specific, targeted information, such as advertisements, coupons, or messages onto a letter or parcel, if there is a match between the sender and/or recipient information on the letter or parcel and the information in the database. The database is constantly updated as letters or parcels pass through the system. The invention also relates to a system for carrying out the process.

BACKGROUND OF THE INVENTION

Currently, vendors who wish to advertise their products have the traditional passive methods at their disposal which include television, radio, billboards, magazines, and newspapers. A passive advertising method means information is delivered to the masses with little attempt to customize the message to individuals. The only method available today to customize the message is to assess, through statistical sampling data, the types of people who might view the message. For example, if a vendor wishes to promote a product which may be of interest to chefs, the vendor may advertise during a cooking show on television. The dilemma with this approach is the advertiser never really knows who sees the advertisement, how many people see the advertisement, and if the advertisement attracted people to buy the product. The concept of statistical sampling has been standard procedure for advertisers because collecting specific individual data has been too costly.

Moreover, in the future, electronic forms of information delivery will outpace many of these passive advertising methods since electronic distribution can target specific populations. With the increased use of electronic information delivery, the traditional letter distribution system may lose appeal, unless the costs can be reduced and delivery improved.

It will also be noted that the senders of letters or parcels have various ways in which to pay for delivery of their material to intended receivers. For example, senders can buy postage stamps or pay for a permit for presorted first class, or bulk rate mail. These traditional approaches are passive in nature, however. Once the postage is placed on the letter or parcel, there is little to no interaction that takes place, other than canceling the postage. The postage is the same for most parts of the country and the letters or parcels are delivered with little attempt to customize the way in which postage is paid for the delivery. One method available today to customize the postage is to buy a permit and bring the large volume of mail to the post office and pay the fee for delivery. The dilemma with this approach is that it is time consuming. Moreover, there is relatively little in way of cost savings, since all domestic letters cost the same to send regardless of their destination.

What is needed is a system or process to entice users to continue to use letter and parcel distribution at lower cost, preferably by using advertising revenues to subsidize the shipping cost. In addition, it would be desirable to develop a system or corresponding process which would bring in advertising revenues by attracting advertisers with the ability to pinpoint the recipients of their promotional messages on letters and parcels before delivery. Moreover, what is needed is a system or process which provides an interactive process for applying or printing information on letters and parcels. Finally, what is needed is a system and/or process applied to a system capable of enticing users to continue to use letter and parcel distribution by simplifying the payment of fees.

SUMMARY OF THE INVENTION

Based on the above and foregoing, it can be appreciated that there presently exists a need in the art for a letter and parcel processing system and corresponding processing method which overcomes the above-described deficiencies. The present invention was motivated by a desire to overcome the drawbacks and shortcomings of the presently available technology, and thereby fulfill this need in the art.

Therefore, it is an object of the present invention to entice users to continue to use letter and parcel distribution by using advertising revenues to subsidize the cost. It is a further object of the present invention to bring in advertising revenues, by attracting advertisers with the ability to pinpoint the recipients of their promotional messages on letter and parcel delivery.

Another object of the present inventor is to provide an interactive process for applying or printing information on letters and parcels.

A still further object according to the present invention is to provide a system and corresponding process capable of enticing users to continue to use letter and parcel distribution by simplifying the payment of fees.

Using Optical Character Recognition (OCR) equipment or the like, recipients of letters or packages are identified to "facing", bar-coding, and sorting machines used for efficient distribution of letters and parcels. With the recipient information known, such as zip code, address, name, demographic or other information, specific customized messages (advertising, community, or other pertinent information) can be printed or applied on the letter or parcel, either on the front, back, or both sides. The information printed or applied can also include coupons, lottery or sweepstakes tickets, or promotional information. The information printed on the letters and parcels can be coded so that when it is turned in to claim the benefit of the coupon, it can be tracked back to the person who used it, and the database of the system of the present invention can be appropriately updated. With this system, broad informational messages can also be sent to the masses.

In another aspect of the present invention, when the sender and receiver information is both known, such as name, address, and zip code, the sender's account is known to the letter or parcel delivery service. Therefore the sender also can be billed directly for the delivery which might be based upon the size, weight, priority, distance, or destination of the letter or parcel. The account information can be printed, coded, or applied in such a way to allow the OCR equipment to read the information. With this system, traditional postage stamps or large volume mail permits are no longer required, and letters and parcels can be priced based upon size, weight, priority, distance, or destination.

The system of the present invention solves the statistical sampling problem for advertisers. With this system, people who receive letters and parcels are known to the letter and parcel delivery and distribution organizations. Their demographic and other data are associated with their address in the database. When an advertiser wishes to target a certain age group or gender, a specific promotional message can be printed or applied on only appropriate letters or parcels. Currently there are many items printed on letters and parcels to assist with the delivery and to cancel the stamps. The system of the present invention allows promotional messages or other information to be printed or applied on the letters or parcels in a similar fashion. Individuals need to keep the letter or parcel delivery service aware of their location in order to continue to receive their mail, therefore the system of the present invention, if used by a common mail carrier, is constantly being updated with the most recent demographic information.

Since the system monitors addresses in order to speed the process of delivering letters and parcels and many times places numerous bar-codes on the mail, it is easy to send the users specified messages customized to their needs by printing or applying it on their letters and parcels. The messages will be printed or applied at any of a number of points, e.g., the facing, coding, cancellation, or sorting process. The information can also be printed or applied in various colors and graphics as well.

Additionally, the system knows when the recipient actually viewed the message (advertisement). Also, if the information applied to the letter or parcel comprises a return coupon, use of the coupon can be monitored and used to update the data in the database. No longer must advertisers accept statistical sampling data to deliver information. The process of the invention allows advertisers to pinpoint exactly who should see the data, customize the data for different potential buyers, know when the potential buyer saw the advertisement (cancellation date on the envelope), and give the buyer the opportunity to use a coded coupon to either buy the product or ask for additional promotional information.

The system of the invention is a major enhancement to the current method of delivering information by mail. Since advertisers are willing to pay to deliver messages, they will pay the letter and parcel deliverers to allow them to promote products to their users. Therefore, while letter and parcel delivery system users today must pay a fee to have their information delivered, the present system allows users to be charged a much reduced fee since advertisers subsidize the use of the distribution system. Advertisers can subsidize the operating costs of the letter and parcel delivery system much like advertisers subsidize programming on BROADCAST radio and television.

Another aspect of the system according to the present invention solves the manually intensive process of printing, distributing, inventorying, selling, and canceling postage or stamps, and the labor intensive process for sending large volume mail. It fixes the problem of charging the same fee regardless of distance or destination. With this system, people who send letters and parcels are known to the letter and parcel delivery and distribution organizations. Their "account" information is attached to their return address. Currently there are many items printed On letters and packages to assist with the delivery such as bar-codes and enhanced zip codes. The system of the invention provides coding of the sender information to be applied in a similar fashion and read by OCR equipment or other automatic scanning devices. In this case, rather than using the OCR machines to sort the letter or parcel, it updates a database to charge the sender a fee based upon things such as the size, weight, priority, distance, or destination of the letter or parcel.

Since the system monitors intended receiver addresses in order to speed the process of delivering letters and parcels and many times places bar-codes on the mail, it is easy to modify the system of the invention to include "reading" the information about the sender, applying or printing postage on the letter or parcel if necessary, and billing the sender for the delivery. The billing system can charge a special account, a credit card on file with the delivery service, or perhaps a debit account at a bank or other financial institution.

Additionally, the system knows when the recipient actually received the letter or parcel. Therefore, when the sender gets a bill from the letter or parcel carrier, an itemized list of receivers, and dates of receipt can be included. No longer must senders wonder when a letter or parcel was delivered. Now the delivery service will provide the specific data to the sender in a timely billing statement.

This new system is a major enhancement to the current method of paying for the delivery of letters or parcels. Senders no longer need to buy stamps or purchase bulk mail permits and deliverers no longer need to produce and sell stamps. The deliverers can now more easily charge rates for letters and parcels based upon the size, weight, priority, distance, or destination of the delivery. This will help to make the deliverer more effective, efficient, and competitive compared with alternate means of information delivery.

Further objects, features and advantages of the present invention will become apparent from the Detailed Description of the Preferred Embodiments when considered together with the attached drawing.

DETAILED DESCRIPTION OF THE PREFERRED EMBODIMENTS

The present invention will now be described with reference to the preferred embodiments shown in the figures.

Figure 1:
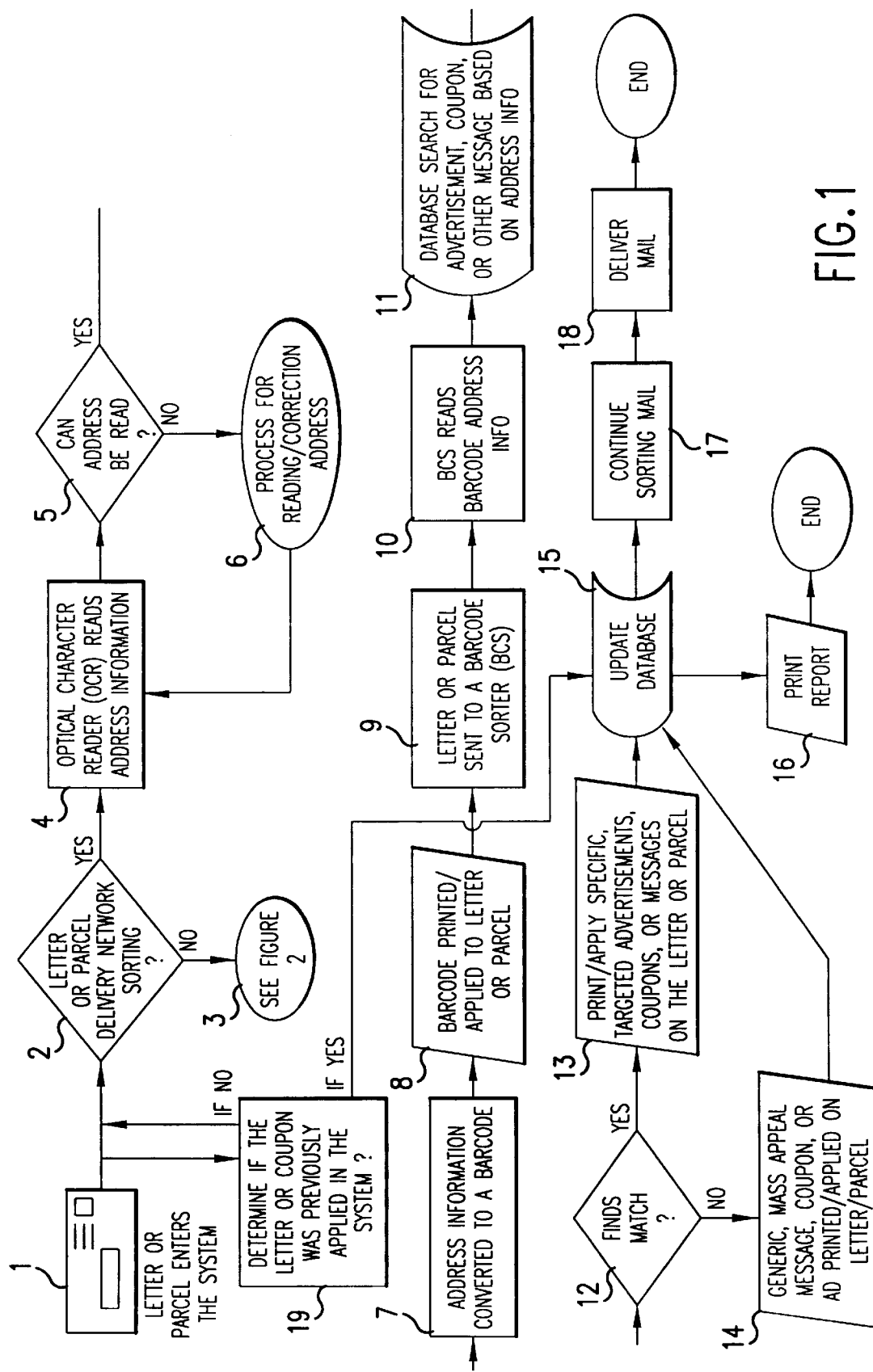
FIG. 1 shows a flow diagram of the system according to the present invention in which information is applied or printed to letters or parcels, and the database used with the system is continuously updated.

FIG. 1 shows a letter or parcel (for the sake of brevity referred to hereinafter as a letter) entering the system of the present invention at step 1. At step 2, the system determines whether the letter requires postage calculation or is ready for delivery network sorting according to the present invention. If the letter requires postage, it is shuttled to step 3, the system shown in FIG. 2 and described below.

If the letter is ready for delivery sorting, it proceeds to step 4, where an optical character recognition (OCR) device reads the address information. At step 5, the system determines whether the address can be read, and if not, then the letter is further processed for the reading or collection of addresses at step 6. If the address can be read, it is converted to a bar code at step 7, and the bar code thus created is printed or applied to the letter at step 8. In presently operating systems a non-machine readable letter is separated, given a distinct identifying bar code. Thereafter, the address is read by a remotely located operator who then enters the information into the system and instricts the system to apply bar code information to the letter.

At step 9, the letter is forwarded to a bar code sorter (BCS), where it is further sorted according to the applied bar code. At step 10, the BCS reads the bar code, and the information is sent to the database of the system.

While the preferred embodiment uses an optical character reader, it should be understood that any suitable means for extracting recipient data from a letter may be utilized, such as for example optical code readers such as lasers, magneto-optic devices, or magnetic information retrieval devices. The present embodiment of the invention also utilizes a bar code system to encode the recipient information after it is read. One of ordinary skill in the art will recognize the bar coding step may be left out altogether, or may be replaced with an equivalent coding method such as other optical, magneto-optical, or magnetic coding devices. The system may also process letters on which bar codes have already been applied by the sender.

The bar code information of the letter is then compared with demographic or other data in the data base at step 11 to determine if there is an appropriate match. If no match with the data in the database is found at step 12, then one or more items of generic or mass appeal information is applied to the letter at step 14. Information as used in this sense is understood to mean a message to the recipient, an advertisement, a coupon, or other item printed on, applied or attached to the letter. After the generic information is applied to the letter, the database is updated at step 15 to reflect this fact, and the demographic or other information associated with the recipient of the letter would then also reflect the fact that certain generic information was also received.

If a match is found between the data in the database and the bar code data on the letter at step 12, one or more targeted pieces of information may be printed on, applied or attached to the letter during step 13. As with the generic information, the database is then updated at step 15 to reflect the fact that a particular recipient received a particular item of targeted information. Of course, it is also possible that a match with the data in the database could indicate that either the sender or recipient has requested that no information be applied to the letter, in which case step 13 would be skipped. At any time during the process of the present invention, reports may be printed at step 16, to reflect the operation of the system, or the contents of the database. For example, a given advertiser can receive demographic or other information about the recipients of its information. Also, printouts or downloads are useful in charging advertisers, for example, based on the number of times their information is applied to letters.

After the database is updated at step 15, the mail is further sorted at step 17, and, finally, delivered at step 18.

If the information applied to the letter at step 13 comprises a return mail coupon, then, after the coupon enters the system at step 1, the system determines at step 19 that the letter is such a coupon, and the database is appropriately updated. This updated data can provide an advertiser who asks to have his coupons applied to letters with specific information, such as when the coupon was delivered, and to whom, and, if the coupon is a return mail coupon or card, when the coupon was returned. Such data would be useful to advertisers in determining whether they are targeting the most appropriate recipients based on demographic or other information in the database. If the determination at step 19 is negative, normal processing continues at step 2.

Figure 2:
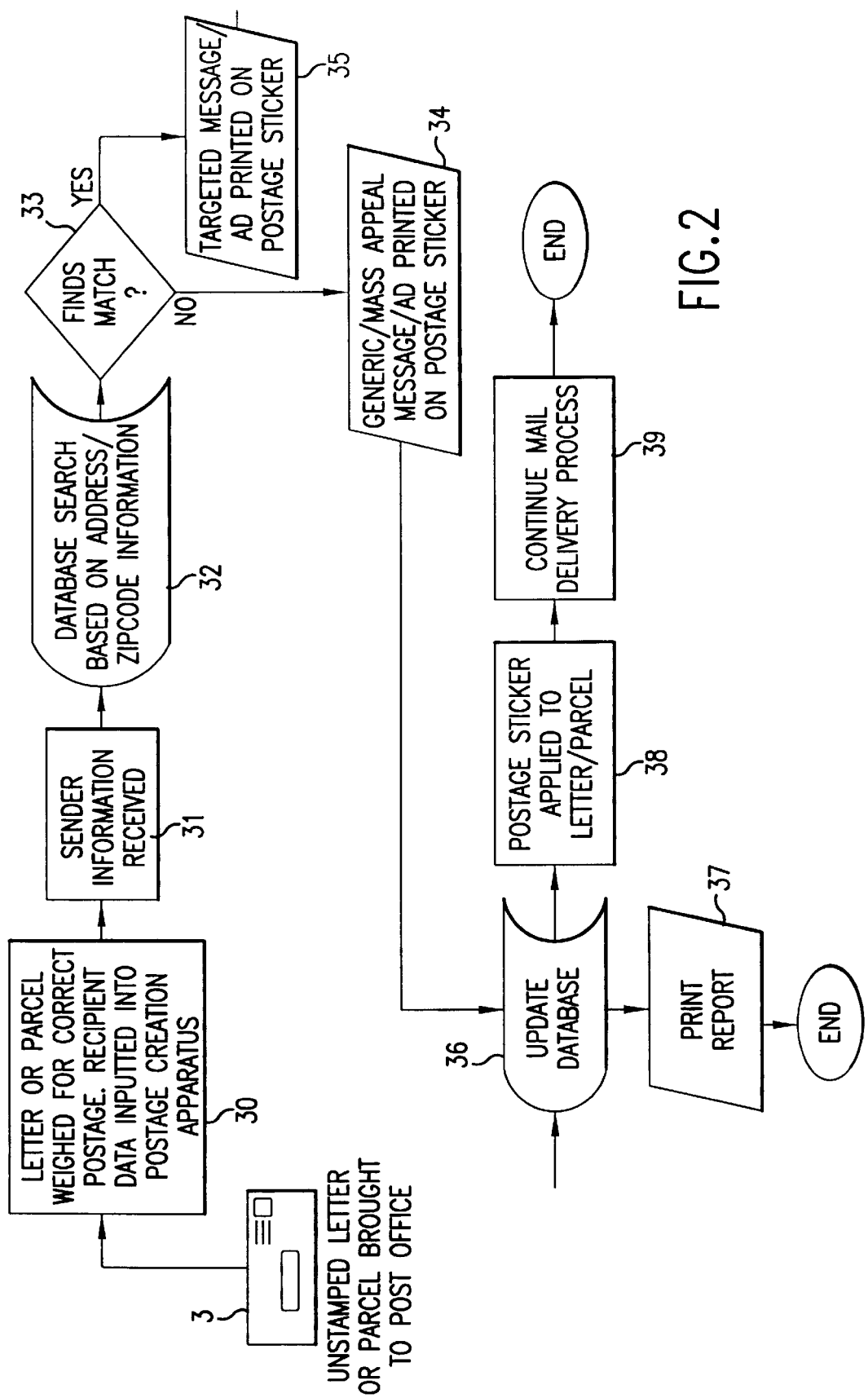
FIG. 2 shows a flow diagram of the process for letters or parcels brought to the carrier for postage assessment.

FIG. 2 illustrates the processing of an unstamped letter, or one recognized as being so at step 2 and routed for alternative processing at step 3 of the process of FIG. 1. At step 30, the letter is weighed and its recipient information read from the letter by OCR, bar code, or other automatic mechanism. The sender information is then also read by OCR device or any other suitable means at step 31. Either the recipient or sender information or both may be entered manually by a clerk, if not machine readable. Alternatively, this system could also process non-machine readable letters in the same manner as the embodiment of FIG. 1.

The recipient and/or sender information is then compared with the database at step 32 to determine if a match of demographic or other information is found. If a match is found at step 33, targeted information is applied at step 35. If no match is found, then generic information is applied at step 34.

At step 36, the database is updated with the sender data, recipient data, postage calculation data and the results of the database comparison of steps 32 and 33. As with the system of FIG. 1, a report can be printed at any time at step 37. At step 38, an appropriate postage sticker or other indicator is applied to the letter, and the mail process is continued, with sorting and delivery of the mail at step 39.

Step 35 could also comprise applying information to a sticker, separate from the letter on which the postage is later applied at step 38. The sticker having both information and postage thereon, would then be applied to the letter, at step 38.

While the present embodiment according to FIG. 2 reads both sender and recipient data, embodiments are also envisioned in which only one or the other is utilized.

Figure 3:
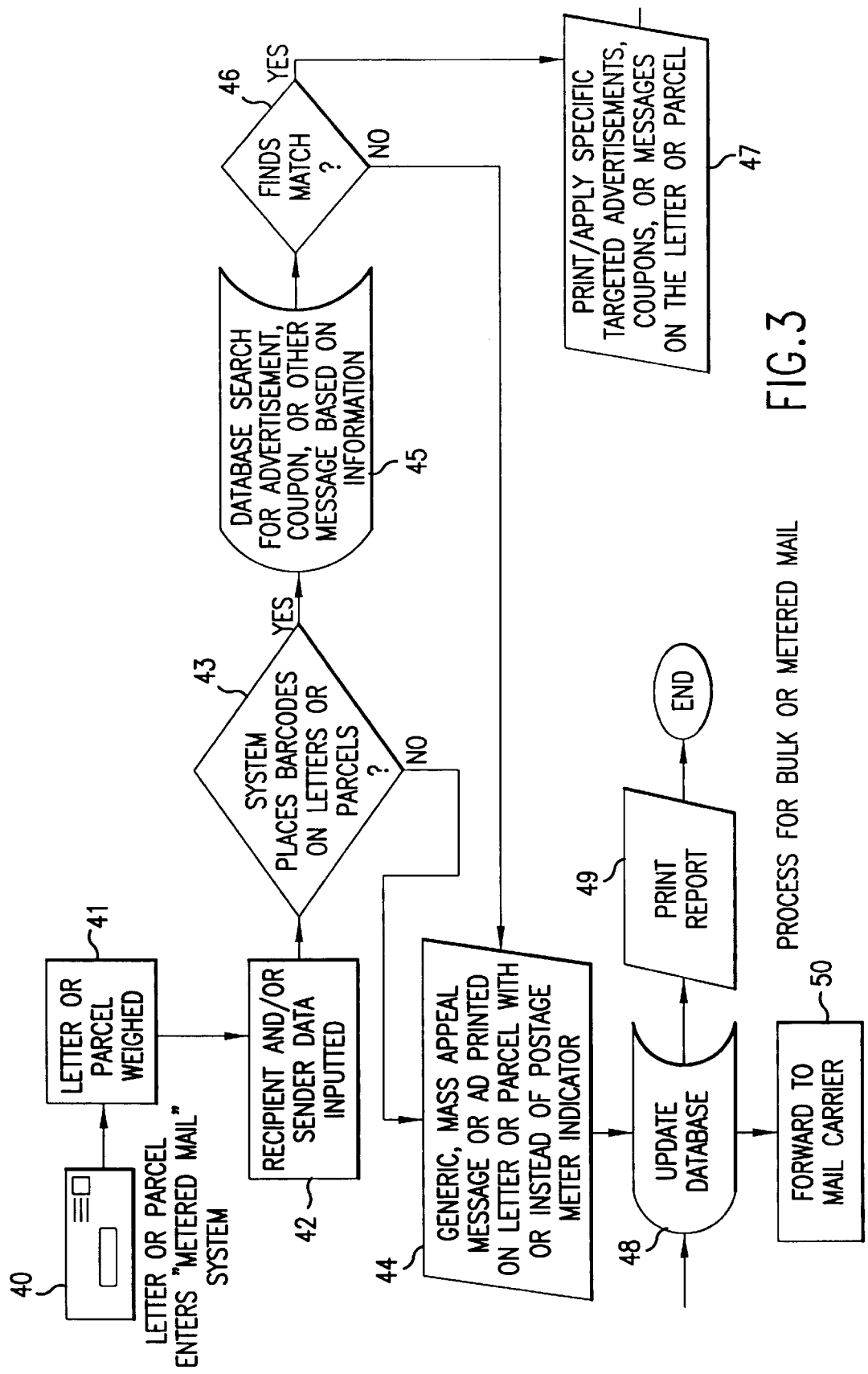
FIG. 3 shows a flow diagram for a process according to the present invention for bulk or metered mail.

FIG. 3 illustrates an embodiment of the present invention, in which the process of the present invention is applied to a postage meter system. At step 40 a letter enters the system. The letter is weighed at step 41. At step 42 the recipient and/or sender data is then read. The data may be read by means of an OCR device, or other automatic mechanism. A bar code may be applied to reflect the recipient data at step 43. If no bar code is applied to the letter, then generic information is applied at step 44 along with or in lieu of a postage indication calculated based on the weight of the letter, the recipient information, the sender information or some combination thereof. When the bar code is applied, the recipient and/or sender data is compared with the data in the data base at step 45, and if there is a match at step 46, targeted information is applied to the letter at step 47 along with or in lieu of a postage indication calculated as described above. If there is no match, then generic information and/or postage indication is applied at step 44. Thereafter, the database is updated at step 48 as with the previously described embodiments of the present invention. Also as previously described, a report may be printed or downloaded at any time at step 49. After either of steps 44 or 47 are completed and the database update of step 48 is performed, the letter is forwarded to a mail carrier at step 50.

In the embodiment of FIG. 3, the process is called out anywhere where a postage meter according to the present invention is located, the database may be resident at the location of the meter or remotely accessible.

Further alternative embodiment according to the present invention will now be described with reference to the preferred embodiments shown in FIGS. 4–7. Following that discussion, additional alternative embodiments, and the advantages therewith, are described below.

Figure 4:
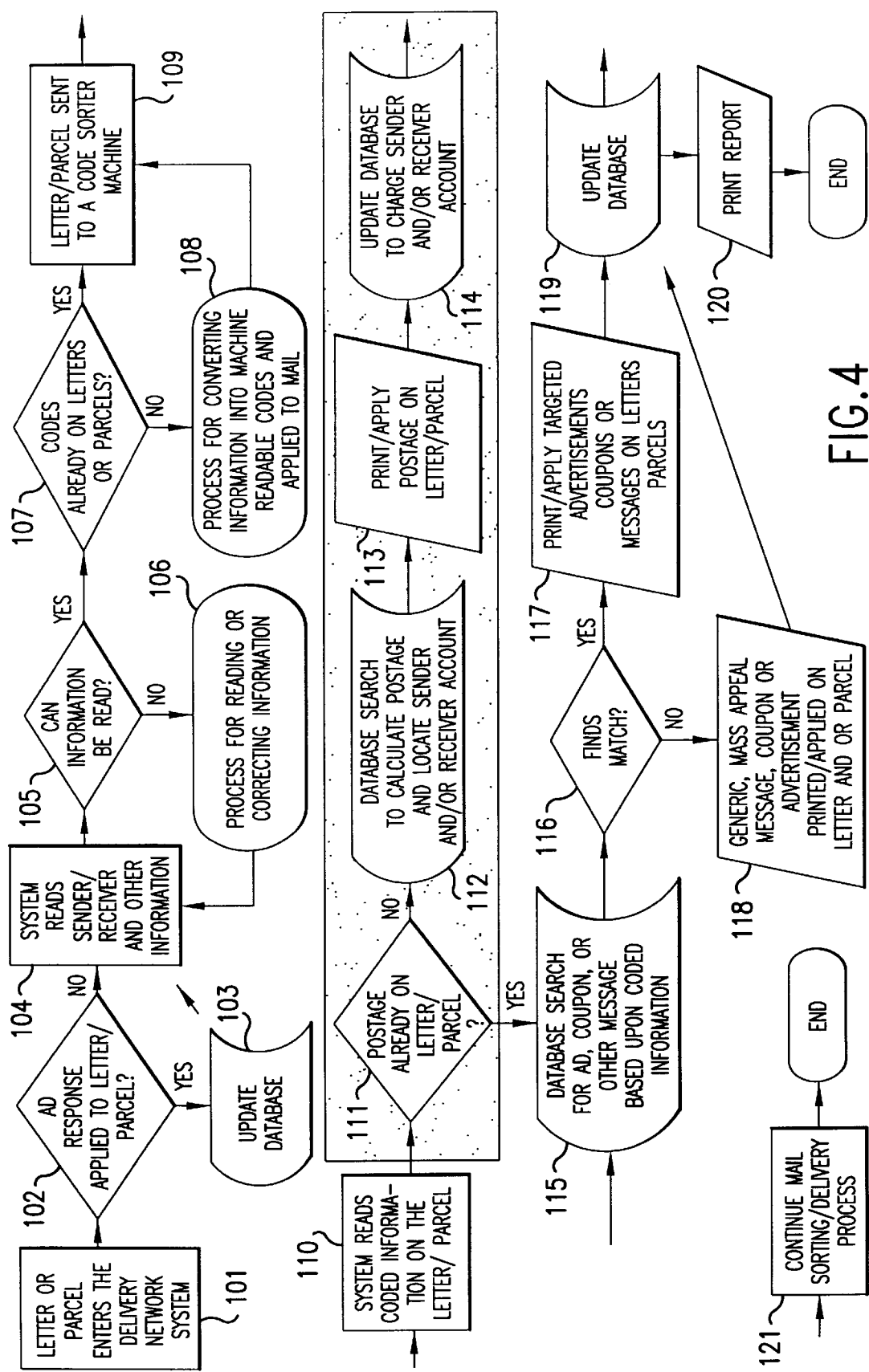
FIG. 4 shows a flow diagram of the system according to yet another preferred embodiment of the present invention in which information (postage and/or advertisements, or other messages) is applied or printed to letters or parcels, and the database used with the system is continuously updated.

FIG. 4 shows a flow diagram of the system according to the present invention in which information (postage and/or advertisements, or other messages) is applied or printed to letters or parcels, and the database used with the system is continuously updated. In particular, FIG. 4 shows a letter or parcel (for the sake of brevity referred to hereinafter as a letter) entering the system of the present invention at step 101. At step 102, a check is performed to determine if information has been previously applied to the letter from an earlier part of the inventive process, e.g., the letter is a response to a coupon or advertisement. When the system determines at step 102 that the letter is such a coupon, the database is appropriately updated in step 103. It should be mentioned that this updated data advantageously can be provided to an advertiser who asks to have his coupons applied to letters with specific information, such as when the coupon was delivered, and to whom, and, when the coupon is a return mail coupon or card, when the coupon was returned. It will be appreciated that such data would be useful to advertisers in determining whether they are targeting the most appropriate recipients based on demographic, psychographic, or other information in the database.

During step 104, when the answer at step 102 is negative the system attempts to read sender and/or receiver, or other information on the letter using OCR equipment or the like, equipment which can machine read information. During step 105, the system determines whether the address can be read, and if not, then the letter is further processed for the reading or correction of the addresses or other information at step 106. It will be noted that in current mail sorting systems, a non-machine readable letter is separated, and given a distinct identifying bar code. Thereafter, the address is read by a remotely located operator who enters the required information into the system and instructs the system to apply bar code information to the letter. If, however, the address can be read, the letter proceeds to step 107, where it is determined whether or not codes (such as bar codes) have already been applied to the letter. In the answer is negative, the letter is further processed for the converting of addresses or other information into machine readable codes, which are then applied to the letter during step 108. If the codes are already on the letter, the letter proceeds to a code sorter machine, e.g., a bar code sorter machine, where the system reads the coded information at steps 109 and 110 and it is further sorted according to the applied bar code. At step 111 the system assesses whether postage has been paid for the letter and, if not, a database search calculates the correct postage based upon sender and/or receiver information and, as appropriate, bills the sender and/or receiver of the letter, prints or applies the postage notification to the letter, and then updates the database, as illustrated in steps 112, 113, and 114, respectively. When the answer is affirmative, step 115 is performed, as discussed in greater detail below.

While the preferred embodiment uses OCR equipment, it should again be mentioned that any suitable means for extracting sender and/or receiver data from a letter may be utilized. For example, the instant invention is not limited to OCR equipment, but advantageously can employ optical code readers such as laser scanners, magneto-optic devices, or other magnetic information retrieval devices, and combinations thereof. In short, any automatic device for determining sender and/or recipient address information from a letter and/or parcel is considered to be within the scope of the present invention. Additionally, the preferred embodiment of the invention under discussion advantageously utilizes a bar code system to encode the recipient information after it is read. Moreover, it should be mentioned here that one of ordinary skill in the art will recognize that the bar coding step may be left out altogether, or may be replaced with an equivalent coding method performed by, for example, other optical, magneto-optical, or magnetic coding devices. The system and corresponding process according to the present invention may also process letters on which bar codes have already been applied by the sender and/or receiver, as discussed below.

Still referring to FIG. 4, the bar code information of the letter is then compared with demographic, psychographic, or other data in the database at step 115 to determine whether there is an appropriate match. When no match with the data in the database is found at step 116, then one or more items of generic or mass appeal information are applied to the letter during step 118. Information as used in this sense is understood to mean, for example, a message to the recipient, or an advertisement, or a coupon, or other item printed on, applied, or attached to the letter. After the generic information is applied to the letter in step 118, the database is updated during step 119 to reflect this fact, so that the demographic, psychographic, or other information associated with the recipient of the letter would then also reflect the fact that certain generic information was also received.

If a match is found between the data in the database and the bar code data on the letter during step 116, one or more targeted pieces of information may be printed on, applied, or attached to the letter in step 117. As with the generic information, the database is then updated during step 119 to reflect the fact that a particular recipient received a particular item of targeted information. Of course, it is also possible that a match with the data in the database could indicate that either the sender and/or recipient has requested that no information be applied to the letter, in which case the applicable one of steps 117 and 118 would be skipped. It should be mentioned that at any time during letter processing according to the present invention, desired reports may be printed at step 120, to reflect the operation of the system, or the contents of the database. For example, a given advertiser can receive demographic, psychographic, or other information about the recipients of its information. Also, printouts or downloads are useful in charging advertisers, for example, based on the number of times their information is applied to letters. In any event, after the database is updated in step 119, the mail is further sorted and delivered in step 121.

Figure 5:
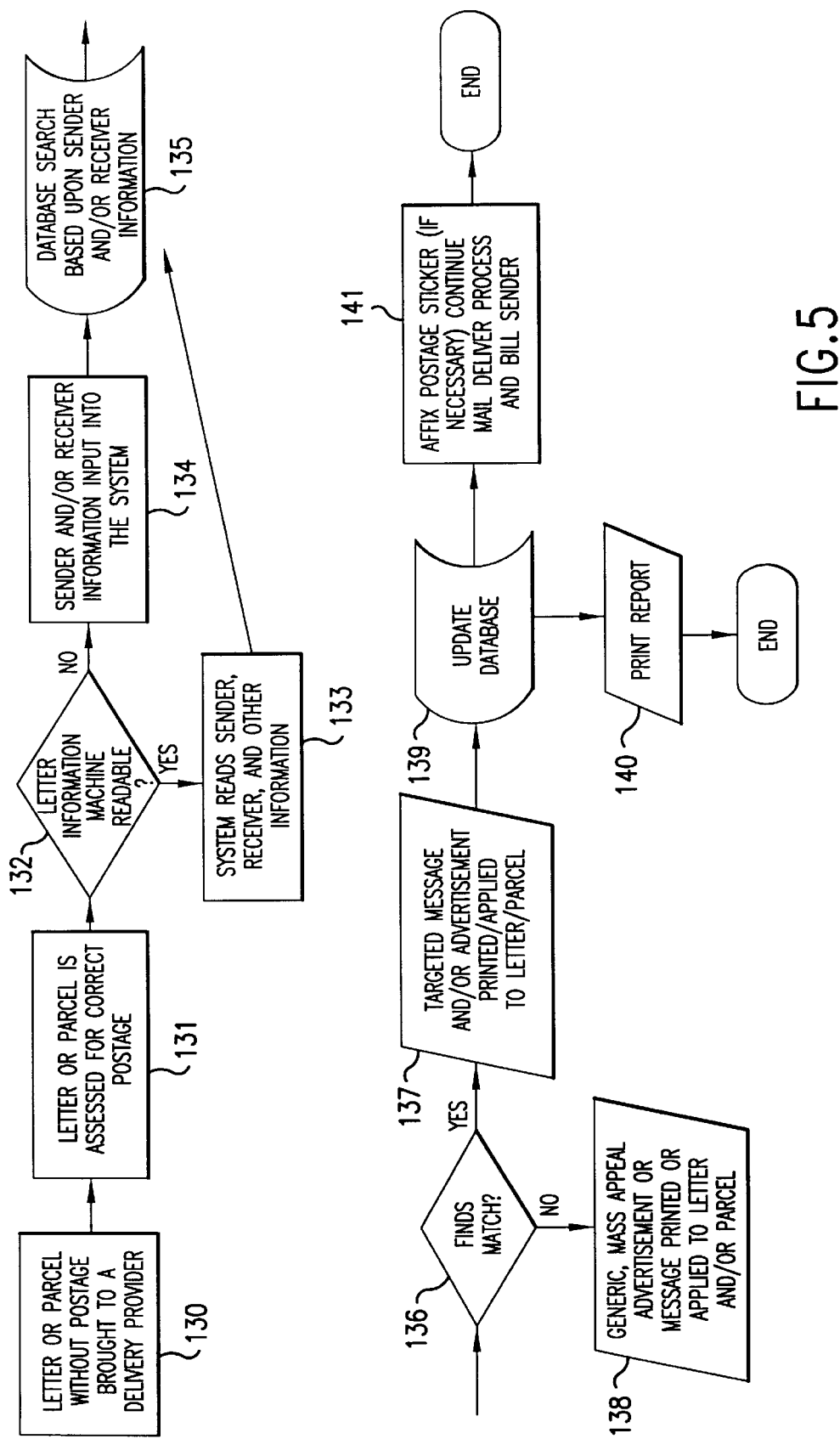
FIG. 5 shows a flow diagram of the process for letter or parcels brought to the carrier for postage assessment.

FIG. 5 illustrates the processing of a letter without appropriate postage when such a letter is brought to a letter delivery provider at step 130. At step 131, the letter is assessed for correct postage and at step 132 the system determines if its sender and/or recipient information can be machine read by OCR or other automatic mechanism. When one of the addresses can be read, appropriate codes can be applied to the letter in step 133. If the address information cannot be read, either the recipient or sender information or both may be entered and applied to the letter manually by a clerk during step 134. Alternatively, this system could also process non-machine readable letters in the same manner as the earlier discussed preferred embodiment illustrated in FIG. 4.

The recipient and/or sender information is then compared with the database at step 135 to determine if a match with demographic or other information is found. When a match is found at step 136, targeted information is applied in step 137; when no match is found, then generic information is applied at step 138. Irrespective of the earlier executed processing path, during step 139 the database is updated with the sender data, recipient data, postage calculation data and the results of the database comparison of steps 135 and 136. As mentioned with respect to the system of FIG. 4, a report can be printed at any time at step 140. During step 141, an appropriate postage sticker or other indicator is applied to the letter, and the mail processing is continued, preferably employing the sorting, delivery, and billing step discussed numerous time before.

It should be understood that steps 137 and 138 should be interpreted to include applying information to a sticker, separate from the letter on which the postage is later applied at step 141, i.e., the sticker having both information and postage thereon, would then be applied to the letter, at step 141. Alternatively, this system could also process and bill senders and/or recipients of the letter in the same manner as the alternative preferred embodiment illustrated in FIG. 4.

While the present embodiments according to the invention discussed thus far read both sender and recipient data, alternative preferred embodiments in which only one or the other is utilized are clearly considered to be within the scope of the present invention.

Figure 6:
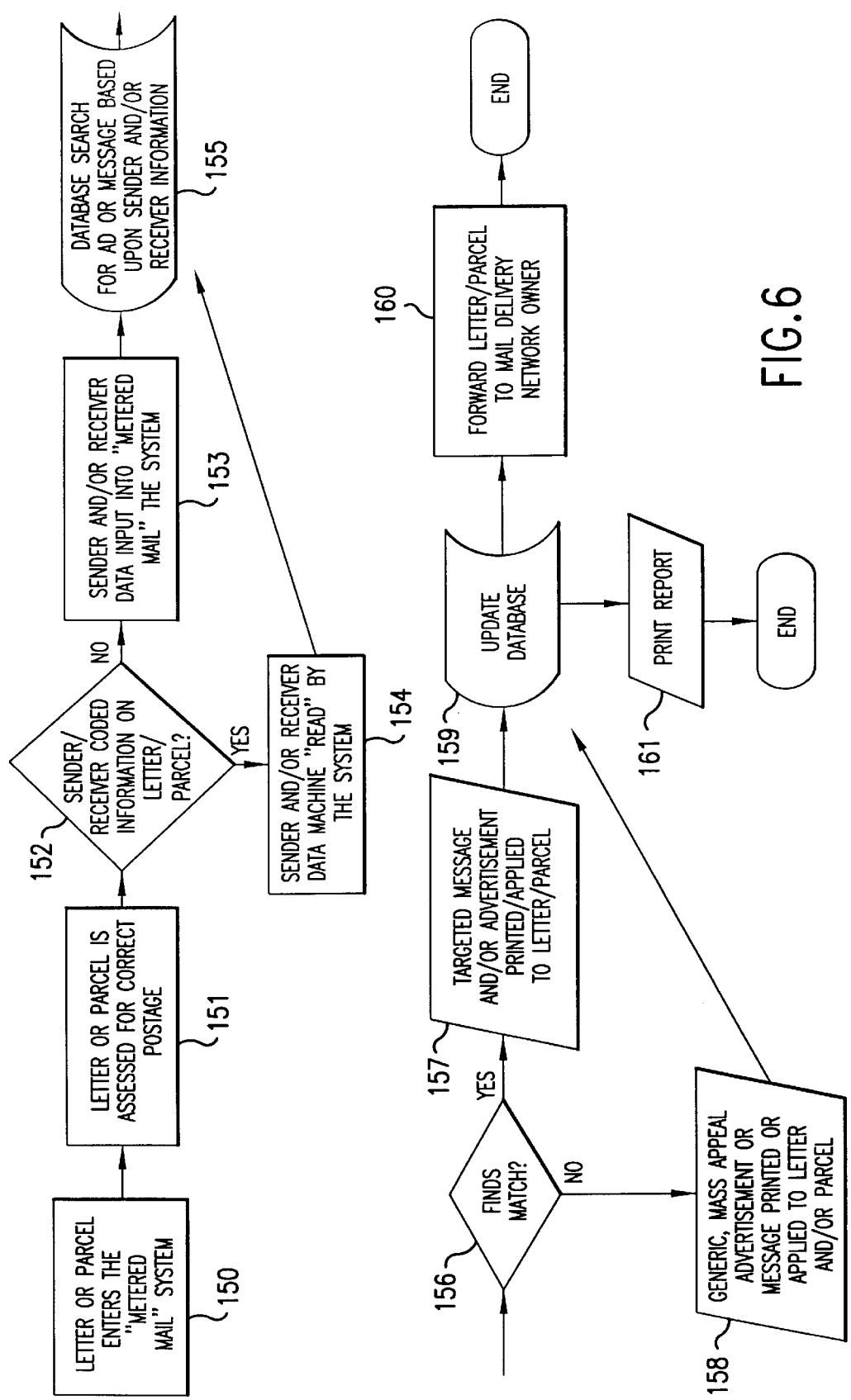
FIG. 6 shows a flow diagram for a process according to the present invention for metered mail.

FIG. 6 illustrates another preferred embodiment of the present invention in which the process of the present invention is applied to a postage meter system or the like. During step 150, a letter enters the system. The letter is assessed for correct postage at step 151 and, at step 152, the system determines whether coded sender and/or recipient information is present on the letter. If it is, the recipient and/or sender data is then read during step 154. As previously mentioned, the data advantageously may be read by an OCR or other automatic device. When no bar code is discernable on the letter, the sender and/or receiver data can be input manually into the metered mail system at step 153. The recipient and/or sender data is then compared with the data in the database during step 155 and, when there is a match at step 156, targeted information is applied to the letter at step 157 along with or in lieu of a postage indication calculated as described above. When no match is found, then generic information and/or postage indication is applied at step 158. Afterwards, the database is updated during step 159, and the letter is forwarded to a mail carrier at step 160. A report can be printed at any time at step 161.

It should be mentioned in connection with the preferred embodiment of FIG. 6, the process is carried out anywhere where a postage meter configured to utilize the process according to the present invention is located. The database may be resident at the location of the meter or may be remotely accessible.

Figure 7:
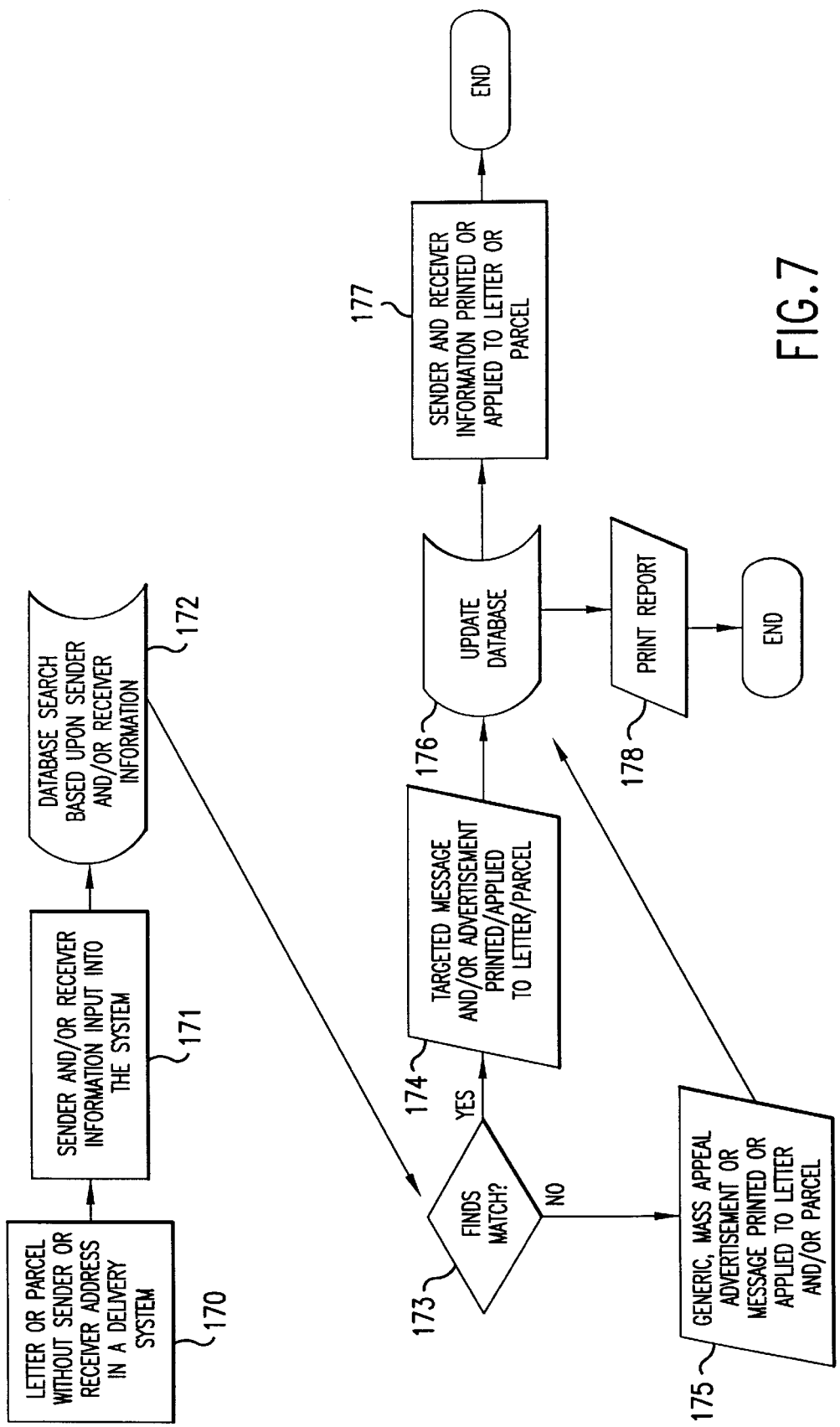
FIG. 7 shows a flow diagram for a process according to the present invention for mail generated by a so-called mail-merge operation.

FIG. 7 illustrates yet another alternative preferred embodiment of the present invention. More specifically, In FIG. 7, a sender address, or a receiver address, or both, are not yet on the letter or parcel in step 170. Using a system to input addresses in step 171, a database, which advantageously can be dedicated to the system, would recognize the address and search for appropriate information to be targeted to the person receiving the letter at step 172. If in step 173 a match is found, a targeted message or advertisement is printed or applied to the letter or parcel in step 174. If in step 173 no match is found, generic, or mass appeal information is applied to the letter or parcel during step 175. At step 176 the database is updated and at step 177 the system places the addresses on the letters or parcels. A detailed report advantageously can be printed during step 178.

While in the embodiment of FIG. 7 the address is printed or applied after the targeted information is printed or applied to the letter or parcel, it is also understood the address can be printed or applied first and then the targeted information would be printed second.

Moreover, while the preferred embodiments according to the present invention can be viewed as directed towards a system for post office use, it will be appreciated that an additional application would be in conjunction with label generators included in shipping software package, e.g., software provided by courier and delivery services. In the case of courier shipping software, each user maintains his own address and addressee database and calls the courier's dedicated server to verify that the requested service, e.g., delivery before noon, is available at the destination. The server then assigns a tracking number to each package and the corresponding shipping label is printed. It will be appreciated by one of ordinary skill in the art that it would require only minor modifications to the shipping software to permit transfer of advertising material from the server to the user for printing on the label or to provide information which allows the computer at the shipper's facility to select one of several pre-stored advertisements for use on the printed labels.

Further embodiments and the associated advantages of the present inventive system and corresponding processed arc described in greater detail below.

A letter or parcel recipient is identified to the system through OCR capability. An optical character recognition (OCR) device is used by letter and parcel deliverers as a way to identify addresses, zip codes, and names. This information is translated into bar-codes, and applied to or printed on the letter or parcel so they become machine readable.

The system is used to identity receivers as being the target for specified information delivery. During the process of reading the address by machines, there are a number of times when particular automatic machines are involved. Thus the system according to the invention can be completely or partially automated. For example, a machine must correctly "face" the letter or parcel so it can be read by the OCR machine. The letter or parcel must be right side up with the stamp on the upper right side. It is only then that the OCR device can read the address. If successful, it places a bar-code on the envelope. The letter or parcel then goes to a machine to be correctly sorted. Another application can occur, for example, at the US Post Office, when sending a letter or parcel, a "stamp" is created for the exact cost for delivery. Currently a bar-code is printed on the "stamp" because the zip code is known and must be input into the "stamp creation" machine. At this point a message or advertisement can also be placed on the letter or parcel, or postage sticker.

Also in the present system, the letter or parcel is sometimes "canceled" so the stamps cannot be used again. The other reason for cancellation is so the sender and receiver know how long it took the deliverer to actually deliver the letter or parcel. Therefore, during the time the letter or parcel is faced, coded, sorted, or canceled, for example, an advertisement, message, or coupon can be printed or applied on either the front, back, or both sides of the letter or parcel.

This information can also be coded so that when someone uses the coupon or requests more information, they can be tracked, and the resulting data used to update the database. Recipients can thus be identified who read and use the promotional messages or coupons.

Since the system of the present invention knows exactly to whom the letter or parcel is being sent, it also knows the addressee's name, gender, title, address and other types of information about the addressee previously collected by the system.

In a preferred embodiment, the system, with various database capabilities, has the ability to keep track of all the senders and receivers. It can identify who is mailing or receiving the information through the address or return address, when they saw the advertisement, and if they used the coupon if it was provided as general or targeted information on the letter. The system can also monitor whether or not the user requests more information about the advertisement, and whether or not the recipient purchases a product being promoted.

All this user information is collected and kept in the on-line log or database. The log would include information on (a) receiver priorities, i.e., from what people or businesses they typically receive information (b) receiver likes, i.e., with what types of businesses or people the receiver prefers to have contact; (c) receiver preferences, i.e., in what types of advertisements they typically are interested, (d) and if they make purchases or use the coupons based upon the advertisements. This information can be collected, evaluated, analyzed, and correlated to instantaneously update the database.

Based upon the volume and types of receivers of letters and parcels, the owners of the letter and parcel delivery system can solicit advertisers to promote their products on the letters or packages. They can show potential advertisers the types of people who receive letters or parcels, how often they typically receive them, how often these receivers use the information to buy products advertised this way, where they prefer to see advertisements on the letters or parcels, and all the data such as various demographic and psychographic data on the receivers. This is important information advertisers would like to have on their potential audience which is not specifically available today.

Advertisers signed on to promote products on the letter and parcel delivery system of the present invention have their advertisements kept in the database. The advertisements might be a simple textual advertisement, a one color picture or graphic, a coupon, a full color text and graphic message, or other information, such as digital audio and video information which is either printed or applied to the letters or packages.

When a letter or parcel goes through the process of being faced, coded, sorted, and canceled, for example; and a receiver is identified, the databases are searched to identify which receivers see which advertisements. Once a match is found, the database sends a printing/applying machine the advertisement to be placed on the letter or parcel. The advertisement will be printed/applied on the letter or parcel and then the process continues for delivery. The system records in the database (a) that particular information was sent, (b) to whom it was sent, with all the various demographic or other information pertinent to the user, (c) where it was placed on the letter or parcel, i.e. front, back, top, bottom, and eventually (d) if the user requested additional information about the advertisement or if the receiver purchased the product using the code on the coupon or message. This information is stored in the database so advertisers can print or download this information in a timely, accurate, and appropriate format. They can request the information to be customized for their needs. Since the information is held in a database, the advertisers can get customized reports based on their needs, as opposed to a mass produced report which may or may not meet their demands.

The database, which holds information on the delivery of the advertisement or other information can also assess how much each advertiser must pay the delivery network owner. There may be different rates charged for a coupon, for text only, for a one color graphic, a full-color text and graphic message, or other type of message. There may be different fees charged for information delivered at various times of the week, month, or year. For instance during high volume times such as Christmas or Valentine's Day there may be a different fee charged; or a fee can be based upon how often receivers see the advertisement. There can be discounts for volumes of messages sent. It is also possible to charge advertisers different fees based upon who sees the material. Certain targeted receivers may be more expensive to send advertisements to.

With all this pertinent information, the mail and parcel deliverer can bill the advertiser.

The point of an advertisement is to promote interest in the particular product. If enough interest is garnered, the receiver might decide to purchase the item immediately by calling in an order using a coded coupon. This information would be captured in the database by the advertiser immediately as a receiver who uses coupons and reads the advertisements.

It is also possible the letter or parcel receiver does not have enough information to decide if he or she wishes to purchase the product. Instead he or she may request additional, more detailed information about the product. This opportunity is available if the advertisers put their telephone number, Internet web page or e-mail address on the message. Again, the advertiser can update their information on the recipient.

At the end of the day, week, month, or year; or at any other appropriate time, a report is generated for the current advertisers, the potential advertisers, and/or the letter and parcel delivery owners to identify the use of this communications system, to what extent it is effective, and the overall benefits of the system. Revenue reports are generated as well.

The letter and parcel deliverer or carrier is paid every time an advertisement is delivered, or a product is purchased. The advertisers pay the letter and parcel deliverer for this service. The recipients have the opportunity to view assorted types of information and potentially reduce the cost for mail and packages. The system is thus mutually beneficial for recipients and users.

The system of the present invention uses a database (relational, hierarchical or other). As an example, if a relational database is used, then, within the database, various indexes will be created and within each index, fields and records will be created. For example, a field might be created for "zip codes" and used as the index to select various records. All zip codes for the United States will be held in that field, each in their respective records. Within the record the index identifies "every street address." Within the record "every street address" a field can be created for "number of members in the family" or "number of adults at the address." This information can be acquired or bought from various sources including, but not limited to the U.S. census bureau data.

When a zip code or address is identified through the mail system either by OCR or bar-code technology, the information is sent to the database and a "logical comparison" can be made to evaluate which messages would be appropriate to apply to the letter or parcel. Stored in another database are the messages which are indexed, for example, based upon number of members in a family, number of adults at an address, or some other criteria. The demographic or other data is then cross referenced to the various zip code, address information, or other recipient information. When the database search finds an appropriate match, for example an identified household in a specific zip code with the appropriate number of adults at the address, the message is printed or applied to the letter or parcel. The database is then updated to confirm the message was sent to the specific address, and the recipient information can be updated appropriately.

In order to measure the effectiveness of the present system, specific information can be applied to the messages, so that when actions are taken by the consumers based upon messages seen on letter or parcels, they can be tracked. For example, a message might include a special phone number to call for more information. The phone number is only available to those people who viewed the message on their letter or parcel. A coupon applied or printed on a letter or parcel might include a code within the Universal Price Code (UPC) information. When the coupon is scanned at a store, it is identified as a coupon from a letter or parcel. Alternatively, the coupon could be a return mail coupon which the system could recognize at step 19, for example in FIG. 1. Once the system recognized the return mail coupon, the data base is updated at step 15, and the coupon then further forwarded to the sorting and delivering steps 17 and 18.

The advertisers using the system would have a vested interest in knowing how effective the medium is for promotion. Therefore, advertisers have an incentive to provide the effectiveness data back to the letter or parcel deliverers to update their database indexes, records, and fields. The more up-to-date the database is, the better able the advertisers will be to target their intended audience. The information would be of value because those records are now updated to include recipient wants and interests. This might mean the advertiser would send more information or coupons to that household, or a competitor may send coupons or advertisements to that household.

In a further embodiment of the present invention, postage can be automatically calculated based on the sender and or recipient information. This postage calculation embodiment can be used alone, or in combination with the process of applying information to the letters, as described in FIG. 2. In this embodiment, sender and recipient data is read from the letter or parcel by an optical character recognition (OCR) device. The OCR reader is used by letter and package carrier to read data such as addresses, zip codes, accounts, and names. This information is translated into bar-codes, and applied to or printed on the letter or parcel so they become machine readable.

The system can also be used to identify letter or parcel size, weight, priority, distance, and destination of the receivers from the sender location. During the process of reading the address by machines, there are a number of times when a machine is involved. A machine must correctly "face" the letter or parcel so it can be read by the OCR machine. The letter or parcel must be right side up with the words right side up. It is only then that the OCR device can read the address and return address. If successful, it places a bar-code on the envelope. The letter or parcel then goes to a machine to be correctly sorted.

Since the system knows exactly to whom the letter or parcel is being sent through the sorting/bar-coding process, it also knows the addressee's name, address and other types of account information about the addressee and it can be accessed or stored in a database. It also can read the sender information as well, including the sender's address and account number.

The present system, with various database capabilities, has the ability to keep track of all the senders and receivers. The system can identify who is mailing or receiving the information through the address or return address, when the letter or parcel was delivered, how much it cost to send, and provide a bill to the sender.

All this user information is collected and kept in an on-line log or database. The log would include information on (a) receivers of the letters or parcels (b) senders of the letters or parcels (c) size, weight, and priority of the letters or parcels, (d) and distance and destination charges for the letters or parcels. This information can be collected, evaluated, analyzed, and correlated to instantaneously update the database.

Based upon the volume and types of receivers and senders of letters and parcels, the owners of the letter and parcel delivery system can more economically and efficiently provide their services. Their customers will no longer be required to purchase stamps or permits to mail letters or parcels, and they will not have to weigh packages to assure the correct postage is affixed. This will limit the deliverer's need for additional human resource to sell or weigh letters or parcels, and it will also limit their need to design, manufacture, distribute, and sell stamps and large volume permits. With the current process this cannot occur today.

When a letter or parcel goes through the process of being faced, coded, sorted, sized, and weighed, for example, and a sender and receiver are identified, the databases are searched to identify the postage rate to be charged. Once a match is found, the database charges the sender account for the delivery. The system then logs various data about the letter or parcel delivery such as: (a) that the letter was sent, (b) to whom it was sent, and (c) how much it cost to send. This information is stored in a database so that the deliverers can quickly and appropriately bill the senders in a timely, accurate, and easy to understand format. Since the information is held in a database, the senders will have the ability to get customized reports based on their needs.

The database which holds information on the delivery of the mail can also assess how much each sender must pay the deliverer. There may be different rates charged based upon size, weight, priority, distance, or destination. There could also be different rates charged based upon when a letter or parcel are sent. For example weekend rates might be different from weekday rates. Mail sent during high volume times such as Christmas or Valentine's Day might be more expensive than during the slower times. The deliverer may choose to offer discounts for volumes of mail and may even start a "frequent usage" program.

With all this pertinent information, the letter and parcel deliverer can bill the sender.

The point of letter or parcel delivery is to get the information to the intended receiver in a timely fashion. With this system, delivery information would be captured in the database by the deliverer and provided to the senders in an itemized bill.

At the end of the day, week, month, or year; whatever time frame is appropriate, a report or bill is generated for the senders, and/or the letter and parcel delivery owners to identify the use of this system, to continuously understand to what extent it is effective, and the overall benefits of the system. Revenue reports are generated as well.

The letter and parcel deliverers get paid every time a delivery is completed for the sender. The deliverer bills a sender's account, credit card, debit account, or other account as appropriate.

As described in the preferred embodiments above, the system of the present invention provides information to recipients of letters and parcels, to provide a means for advertisers to more specifically target their messages, to provide additional uses for traditional letter and parcel delivery, and to perhaps lower the cost of traditional letter and parcel delivery through the use of subsidies paid by the advertisers to use the system. Currently people have numerous choices in the way in which they send information. In addition to traditional letter and parcel delivery services they also have electronic systems in which to deliver information, as well as faxes and overnight delivery services. As the costs of electronic communication are lowered, more people will choose this highly efficient means to deliver information. Unfortunately, once a user logs off an electronic communication system, any information is lost, unless the user takes an extra step to print the information. With a letter or parcel delivery system, the users have a copy of the advertisement, message, or coupon until they throw it away. There is no need to take the extra step to print the information received. The other benefit of the traditional letter and parcel delivery system is it is currently pervasive and its appeal will continue for sometime as an easy method to deliver information to individuals and mass audiences. Reaching this perhaps untapped audience for these types of advertisements, messages, and product solicitations will reap benefits to those who know best how to target their message.

The letter and parcel deliverers, in order to continue to be successful will want to offer the best service to their users and thereby grow their business. From a business perspective, one way to assure a large user base of subscribers is not only to provide the services the customers want, but also to provide the service at a low-cost.

In the past, it has not been profitable to provide letter and parcel delivery at continued low cost. The costs, instead, have been increasing. With the system of the present invention, however, advertisers pay to subsidize the service and therefore allow access to the system by the users for a potentially reduced fee. The advertisers pay the letter and parcel carriers to place their advertisements and other information on letters and packages which are then delivered to the recipients.

The system can also be used to interactively provide information about the senders and recipients of letters and parcels so the carriers can appropriately monitor and bill the senders based upon the size, weight, priority, distance, and destination of the letter or parcel without the need for stamps or large volume permits. The system enhances the traditional letter and parcel delivery services and lowers the cost of traditional letter and parcel delivery by eliminating the need to create, sell, and distribute stamps, and by innovatively charging postage based upon the size, weight, priority, distance, and destination the letter or parcel must travel.

The new system also allows the carriers to reduce their administrative costs for producing and selling stamps, and they can more easily charge rates for letter and parcel delivery based upon the size, weight, priority, distance, and destination.

The system of the invention thus provides advertisers with a targeted and identifiable mass "customized" audience for them to promote their products and services. In the past the only way to understand who might be viewing an advertisement was to statistically collect sampling data. For example, AC Nielsen Co. can determine approximately how many of the potential 985 million homes with TV sets are watching a particular show by sampling 4000 households. This gives the best representation available of the percentage of homes who have tuned in to a certain television channel at a specified time. It will not however, be able to identify exactly who, how many, or what type of people actually saw the program. It cannot account for people talking on the telephone, or people who have left the room to get something from the kitchen or who leave to use the bathroom. Nor can the system detect when the television is on, but no one is really watching.

The novel letter and parcel information delivery system of the present invention can target and identify specific users to view an advertisement or receive a coupon, and can determine specifically who actually saw it, when they saw it, and if they used the coupon. When an advertisement or coupon is to be delivered, the vendor will identify to whom the information should be sent. They may choose a geographic area, a specific gender, a specific street, or even a target audience as broad as everyone in the United States. They can also target various types of businesses, or professions, such as doctors, or lawyers. The system can detect who is to receive a letter or parcel and through the use of a database search, various targeted advertisements can be applied to, or printed on the letter or parcel during the facing, coding, cancellation, and sorting process. Messages with a broad perspective can also be sent without targeting specific groups. The messages can either be printed directly on the letter or parcel, or they can be applied in the same manner a label is applied. Advertisers can be assured the intended customer is seeing the promotional material. They are also able to know the name, gender, location and other demographic data of the targeted receiver of the information. The system provides a means for the recipient to purchase the product by using a coupon. With various codes printed on the message or coupon, the advertisers will know the success of their promotional campaign.

The system of the present invention also provides carriers of letters and parcels with an interactive capability to charge senders based upon the size, weight, priority, distance, and destination of an item in an economical fashion without the use of stamps or other large volume permits. In the past the only way to distribute large volumes of mail was to use stamps or other bulk postage permits and charge similar rates whether a letter or parcel was being sent around the block or across the country. For example, if someone in New York wanted to send two letters, one to someone in Hawaii and one to someone who lived next door, if the size and weight of the letter were similar, the sender would be charged the same rate for the two letters and they would be delivered in a similar amount of time. The system as it operates today cannot account for the additional costs of sending letters or parcels across the country or to hard to reach destinations. In essence, the letters being sent across the country or to rural locations are being subsidized by the letters which are being sent to less costly locations.

The novel letter and parcel information delivery system allows carriers to limit the number of stamps or postage created, held in inventory, distributed, and canceled. This provides cost savings to the carriers. The system of the present invention is also more convenient for the senders since they no longer must have their letters or parcels weighed, and they no longer have to continually purchase postage to affix to letters or parcels. Also, the senders will know exactly who received their letter or parcel and exactly when it was delivered. They will receive this information in their billing statement, similar to the way the telephone companies let their customers know how much they owe based upon who was called and for how long the conversation lasted. A benefit of the system of the invention is that senders, whether they be individuals, companies, or advertisers can be assured the intended customer has received the material. They will also be able to know the name, location, and cost of sending information to the targeted receiver of their information.

With traditional public access media, whether advertisers use radio, billboards, television, newspapers, or magazines, their messages are seen by a certain number of potential buyers. The dilemma, of course, is that, in order to reach their intended audience, advertisers must spend large amounts of money sending the message to not only the targeted audience, but also to many audience members who have no interest in the product or service. They are not the intended audience, they are simply part of the "mass audience." Sending this non-relevant message to an audience not interested in the product costs the advertisers lots of money.

The system of the present invention allows messages to be targeted to specific customers, and there can be immediate feedback as to who exactly saw the advertisement.

Also, with traditional letter and parcel delivery systems, whether information is being sent one mile or 3000 miles, senders are charged the same amount and must purchase postage stamps or permits for delivery. The dilemma of course, is currently there is no feasible alternative to charge based upon distance and ease of delivery. Also in order to send letters and parcels today, one needs to purchase postage stamps or for large volumes of mail, one can purchase a bulk rate, or presorted first class permit. This is an expensive, difficult and time-consuming endeavor.

The system of the present invention allows the carrier to customize rates for delivery and to drastically limit the number of stamps and permits required for letter and parcel delivery, making the delivery process more convenient and less costly.

Advertisers using the system of the invention identify items to promote and to whom they are targeting their messages. They may target families, businesses, geographic areas, or zip codes. During the letter and parcel delivery process; facing, coding, cancellation, and sorting machines using OCR technology can identify the recipient data, i.e., to whom the letter or parcel is to be delivered. The letter or parcel can be from a domestic or international sender. The system according to one embodiment of the present invention reads the intended recipient data (by gender, address, or other appropriate demographic or other data) and searches its database to find a message which is targeted for that particular recipient. The system would also know from whom the recipient typically receives letters or parcels and can record that information as well to update their demographic, psychographic and other information. Therefore, if a recipient usually orders clothes through the mail, that information can be provided to potential advertisers. If a recipient usually gets mail from Chicago, airlines may want to promote airfares to Chicago. If a recipient lives in a certain area, a candidate for office may want to send specific information to that person.

The system of the present invention has a database of advertisements which are delivered to targeted users at specific times of the week, month, or year. For example, at the beginning of the week, advertisers can promote food shopping, while on the weekend they may want to emphasize entertainment or dining out. When the database searches and finds it must deliver a specific message to its potential targeted audience, it will search its user database to find matches. When it finds a match, whenever that user receives a letter or parcel, the system applies a message to it either on the front, back, or both sides of the letter or parcel. Of course that system allows senders/recipients to refuse to have information applied to their letters, in which case, the database search would so indicate.

During holiday times, advertisers may want to promote toys or other children's gifts to users who are identified as being interested in these products. A television show may wish to promote an upcoming episode or a movie which will play on a particular evening. The same process occurs for each advertisement. The advertising database realizes it must deliver a message and searches its user database to find appropriate customers. When it finds a match, it applies or prints a message to the letter or parcel being sent.

The benefits of this system are numerous. Not only can specific advertising be targeted, but also, every time a promotional message is sent the system can track who saw it, when they saw it, and give the user the opportunity to purchase the product, or obtain additional information, to indicate the success of a given advertisement, for example, through the use of coded coupons or sweepstakes. These are all benefits not currently offered by current mass media.

Another benefit of the system of the present invention is that advertisers have access to the targeted audience at times when they did not have access to them in the past. If someone is working from home, at an office, or traveling, advertisers lost the ability to promote their products during those times. Few people see billboards, watch TV, or listen to the radio while at work. With the present system, however, letters and parcels are received at both home and work. Receiving information during work opens an entire new market to advertisers. While some users or businesses may at first not like to see advertising on their mail, when they realize that the mail delivery system is able to reduce their costs, this obstacle or concern will soon be ameliorated. The majority of the TV watching public, for example, views commercially sponsored television as opposed to commercial free programming.

As society changes, so do their wants and needs. The dilemma with current market research is it is only as good as the most recent survey. With the system of the present invention, however, the database of demographic and other information is constantly being updated by tracking current demographic information about the recipient, the coupon usage by the recipient, and from whom the recipient typically receives information. When a recipient receives information from someone in a foreign country, the system knows they have business or pleasure abroad. Recipients who receive cultural information, for example, are identified as people who are interested in the arts and entertainment.

The database is constantly being updated with this demographic or other information, providing the advertisers, who subsidize the carrier, or the carrier itself with the most current information on the recipients. This information can also be of benefit to advertisers who wish to promote their products via other media, electronic means, television, or radio. Advertisers may have a targeted audience interested in their services that can be contacted in any of a number of ways, including not only letters and parcels, but also via other communication means as well. Therefore the demographic data is not only of benefit to advertisers through the use of letters and parcels. This data can be used to solicit potential users via other media as well.

Senders of letters or parcels also will identify to whom they are targeting their messages by placing a receiving address on the mail. They will also place their return address with appropriate coded account numbers on the mail as well. During the letter and parcel delivery process; facing, coding, and sorting machines using OCR technology can identify to whom the letter or parcel is to be delivered. This same equipment can identify who has sent the mail, the size of the mail, how much the mail weighs, the priority of the mail, the distance, and destination charges for the mail. The letter or parcel can be from a domestic or international sender as long as they have an account with the deliverer. The system will read the sender data, identify the sender and all other pertinent delivery instructions and search the database to find the account of the sender and bill the sender for the cost of delivery. The system monitor also identifies the recipient data, i.e., to whom the mail is being sent, and when the mail was delivered. This data is kept in a database and will be provided to the sender when the bill is sent. This bill can be sent weekly, monthly or in any other appropriate time frame. The bill can be sent electronically as well as in a traditional hard copy format.

The benefits of this part of the system according to the present invention are numerous. Not only can specific delivery rates be created based upon size, weight, priority, distance, and destination, but carriers can now more effectively and appropriately charge the senders based upon these criteria.

Carriers will no longer have to spend money on creating, producing, distributing, selling, inventorying, and canceling postage. This provides an opportunity to save money for the deliverer.

Senders will now also be able to easily and cost effectively know when the intended recipient received a particular piece of mail and track their postage costs through the carrier's billing process. The senders also no longer will have to wait in line to buy postage. These are all benefits not currently offered with the traditional method of letter and parcel delivery today.

The benefits of the present invention can be summarized as stated below. Advertisers will know exactly who is seeing their promotional material. No longer must they rely upon statistical sampling through the major research organizations. They will know exactly how many people are seeing the information, when they have seen it, and how often they have seen it. This will allow them to more closely monitor and target the advertisements. They can also reach their intended audience at various times of the day, including during what is typically work time. Currently they cannot reach many of their audience during work when they do not have access to TVs, radios, or billboards. With the interactive nature of the system, advertisers will have easy access to all their specified and targeted audience members.

Further benefits are that the system will know who receives advertisements, messages, and coupons, and will know all their demographic, psychographic, and other information. It will also know from whom they receive letters and parcels, and will keep all this information in a database. Advertisers can target who will see their ads and pay a fee to the letter and parcel deliverers for each ad printed. The ads will be seen on the letter or parcel. Perhaps the ad will be seen on the front, back or both sides and may be in one color or multiple colors. It can be text only, or the messages can include text, graphical images, and audio or visual images.

The system, and its interactive nature, will give receivers of the advertisements, messages, and coupons the capability to order the product immediately after having seen the advertisement through a telephone number on the message or coupon. A true impulse-buying situation can be encouraged.

The system allows for various reports to be generated and customized for advertisers, letter and parcel deliverers, and potential advertisers.

Deliverers of letters and parcels will no longer be required to create, produce, distribute, and sell postage stamps or large volume mail permits. This will allow them to be more cost effective. It will also enhance the service they provide to the senders since the senders will no longer need to buy stamps or permits. They mail their letter or parcel and receive a bill for services rendered.

The system will allow the deliverers to more accurately charge for delivery of letters and parcels based upon such criteria as size, weight, priority, distance, and destination. The system will also provide the deliverers with the ability to easily, economically, and interactively bill the senders for the delivery and provide the senders with an itemized bill for the services provided. The system can provide the deliverers with the ability to interactively charge the sender's account, credit card, debit card account, or other accounts as deemed to be appropriate.

The system, and its interactive nature, will give senders the ability to quickly know when their letters and parcels were delivered to the receivers.

The system allows for various reports to be generated and customized for senders about their letter and parcel deliveries.

While the present invention has been described in terms of numerous preferred embodiments, one of ordinary skill in the art will recognize, that additions, substitutions and improvements may be made while remaining within the scope and spirit of the appended claims.

What is claimed is:

1. A method for operating a system for preparing letters and parcels for shipment, the system having a database having data, targeted information and delivery charges stored therein, the method comprising steps for:

(a) reading recipient data from one of the letters and parcels;

(b) determining if there is a match between the recipient data and the data in the database;

(c) when a match is determined, applying targeted information to the one of the letters and parcels; and (d) updating the database to reflect the results of step (c).

2. The method as recited in claim 1, wherein said database further comprises non-targeted information, and wherein the method further comprises:

(e) when no match is determined, applying non-targeted information to the one of the letters and parcels.

3. The method as recited in claim 1, wherein said step (c) comprises applying targeted information to the one of the letters and parcels by printing the targeted information.

4. The method as recited in claim 1, wherein step (c) comprises applying the targeted information to the one of the letters and parcels by attaching a removable coupon.

5. The method as recited in claim 1, further comprising:
(f) calculating a specific delivery charge based on said recipient data and recording said specific delivery charge associated with the one of the letters and parcels.

6. A method for operating a system for preparing letters and parcels for shipment, the system having a database having data, targeted information and delivery charges stored therein, the method comprising steps for:
(a) reading sender data from one of the letters and parcels;
(b) determining if there is a match between the sender data and the data in the database;
(c) when a match is determined, applying targeted information to the one of the letters and parcels; and
(d) updating the database to reflect the results of step (c).

7. The method as recited in claim 6, wherein said database further comprises non-targeted information, and wherein the method further comprises:
(e) when no match is determined, applying non-targeted information to the one of the letters and parcels.

8. The method as recited in claim 6, wherein said step (c) comprises applying targeted information to the one of the letters and parcels by printing the targeted information.

9. The method as recited in claim 6, wherein step (c) comprises applying the targeted information to the one of the letters and parcels by attaching a removable label.

10. The method as recited in claim 6, further comprising:
(f) calculating a specific delivery charge based on said sender data and recording said specific delivery charge associated with the one of the letters and parcels.

11. A method for operating a system for preparing letters and parcels for shipment, the system having a database having data, targeted information and delivery charges stored therein, the method comprising steps for:
(a) reading sender data and recipient data from one of the letters and parcels;
(b) determining if there is a match between at least one of the sender data and the data in the database and the recipient data and the data in the database;
(c) when a match is determined applying targeted information to the one of the letters and parcels; and
(d) updating the database to reflect the results of step (c).

12. The method as recited in claim 11, wherein said database further comprises non-targeted information, and wherein the method further comprises:
(e) when no match is determined, applying non-targeted information to the one of the letters and parcels.

13. The method as recited in claim 11, wherein said step (c) comprises applying targeted information to the one of the letters and parcels by printing the targeted information.

14. The method as recited in claim 11, wherein step (c) comprises applying the targeted information to the one of the letters and parcels by attaching a label.

15. The method as recited in claim 11, further comprising:
(f) calculating a specific delivery charge based on said sender data and said recipient data and recording said specific delivery charge associated with the one of the letters and parcels.

16. A method for operating a system generating labels for letters and parcels prior to shipment, the system having a database having data, targeted information and delivery charges stored therein, the method comprising steps for:
(a) identifying recipient data associated with one of the letters and parcels;
(b) determining if there is a match between the recipient data and the data in the database; and
(c) when a match is determined, generating a targeted label including targeted information for the one of the letters and parcels.

17. The method as recited in claim 16, further comprising the step of:
(d) updating the database to reflect the results of step (c).

18. The method as recited in claim 16, further comprising the step of:
(e) calculating a specific delivery charge based on said recipient data and recording said specific delivery charge associated with the one of the letters and parcels.

19. The method as recited in claim 16, wherein said database further comprises non-targeted information, and wherein the method further comprises:
(f) when no match is determined, generating a label including non-targeted information for the one of the letters and parcels.

20. A system for generating labels for letters and parcels prior to shipment, the system having a database having data, targeted information and delivery charges stored therein, the system comprising:
first means for identifying recipient data associated with one of the letter and parcels;
second means for determining if there is a match between the recipient data and the data in the database; and
third means for generating a targeted label including targeted information for the one of the letters and parcels when a match is determined.

21. The system as recited in claim 20, further comprising:
fourth means, operatively connecting said third means to the database, for updating the database following operation of said third means.

22. The system as recited in claim 20, further comprising:
fifth means for calculating a specific delivery charge based on said recipient data and recording said specific delivery charge associated with the one of the letters and parcels in the database.

23. The system as recited in claim 20, wherein said database further comprises non-targeted information, and wherein the system further comprises:
sixth means for generating a label including non-targeted information for the one of the letters and parcels when no match is determined.

24. A method for operating a system generating labels for letters and parcels prior to shipment, the system having a database having data, targeted information and delivery charges stored therein, the method comprising steps for:
(a) identifying sender data associated with one of the letters and parcels;
(b) determining if there is a match between the sender data and the data in the database; and
(c) when a match is determined, generating a label including targeted information for the one of the letters and parcels.

25. The method as recited in claim 24, further comprising the step of:
   (d) updating the database to reflect the results of step (c).

26. The method as recited in claim 24, further comprising the step of:
   (e) calculating a specific delivery charge based on said sender data and recording said specific delivery charge associated with the one of the letters and parcels.

27. The method as recited in claim 24, wherein said database further comprises non-targeted information, and wherein the method further comprises:
   (f) when no match is determined, generating a label including non-targeted information for the one of the letters and parcels.

28. A system for generating labels for letters and parcels prior to shipment, the system having a database having data, targeted information and delivery charges stored therein, the system comprising:
   first means for identifying sender data associated with one of the letters and parcels;
   second means for determining if there is a match between the sender data and the data in the database; and
   third means for generating a label including targeted information for the one of the letters and parcels when a match is determined.

29. The system as recited in claim 28, further comprising:
   fourth means, operatively connecting said third means to the database, for updating the database following operation of said third means.

30. The system as recited in claim 28, further comprising:
   fifth means for calculating a specific delivery charge associated with the one of the letters and parcels and recording said specific delivery charge in the database.

31. The system as recited in claim 28, wherein said database further comprises non-targeted information, and wherein the system further comprises:
   sixth means for generating a label including non-targeted information for the one of the letters and parcels when no match is determined.

32. A process for handling mail comprising the steps of:
   (a) providing a database having data and targeted information therein;
   (b) reading sender data from a piece of mail;
   (c) comparing the sender data with the data in the database to determine if there is a match;
   (d) if there is a match, applying targeted information to the piece of mail; and
   (e) updating the database to reflect the results of step (c).

33. The process according to claim 32, wherein said database further comprises non-targeted information, and wherein the process further comprises, after step (c), if there is no match, the step of applying non-targeted information to the piece of mail.

34. The process according to claim 33, wherein said database further comprises non-application data of senders on whose mail information is not to be applied, and wherein said step (d) is skipped, when there is a match with nonapplication data.

35. The process according to claim 33, further comprising the step, after said step (b) of calculating postage based on said sender data and applying postage data to said piece of mail.

* * * * *